(12) United States Patent
Pehlke

(10) Patent No.: US 12,081,258 B2
(45) Date of Patent: Sep. 3, 2024

(54) RF FRONT-END WITH FILTER-BASED INTERFACE TO MULTI-FEED ANTENNA

(71) Applicant: SKYWORKS SOLUTIONS, INC., Irvine, CA (US)

(72) Inventor: David Richard Pehlke, Westlake Village, CA (US)

(73) Assignee: SKYWORKS SOLUTIONS, INC., Irvine, CA (US)

( * ) Notice: Subject to any disclaimer, the term of this patent is extended or adjusted under 35 U.S.C. 154(b) by 204 days.

(21) Appl. No.: 16/911,726

(22) Filed: Jun. 25, 2020

(65) Prior Publication Data

US 2020/0412403 A1    Dec. 31, 2020

Related U.S. Application Data

(60) Provisional application No. 62/899,239, filed on Sep. 12, 2019, provisional application No. 62/867,474, filed on Jun. 27, 2019.

(51) Int. Cl.
*H04B 1/48* (2006.01)
*H04L 5/14* (2006.01)

(52) U.S. Cl.
CPC .............. *H04B 1/48* (2013.01); *H04L 5/14* (2013.01)

(58) Field of Classification Search
CPC .............. H04B 1/006; H04B 1/48; H04L 5/14
See application file for complete search history.

(56) References Cited

U.S. PATENT DOCUMENTS

| | | | | |
|---|---|---|---|---|
| 8,369,250 | B1* | 2/2013 | Khlat | H04B 1/0057 370/280 |
| 10,084,489 | B2* | 9/2018 | Mura | H04B 1/006 |
| 10,403,955 | B2* | 9/2019 | Srirattana | H04B 1/0064 |
| 2014/0321339 | A1* | 10/2014 | Pehlke | H04B 1/006 370/281 |
| 2016/0044677 | A1* | 2/2016 | King | H04W 24/02 455/450 |
| 2016/0112072 | A1* | 4/2016 | Bauder | H04B 1/005 370/297 |
| 2017/0207534 | A1* | 7/2017 | Zhang | H04B 1/18 |
| 2017/0373368 | A1* | 12/2017 | Srirattana | H04B 1/0064 |
| 2017/0373730 | A1* | 12/2017 | Pehlke | H04B 7/0413 |
| 2018/0034152 | A1* | 2/2018 | Mura | H04B 1/006 |
| 2018/0337706 | A1* | 11/2018 | Yamazaki | H03F 1/56 |
| 2020/0186242 | A1* | 6/2020 | Miller | H04B 7/18513 |

* cited by examiner

*Primary Examiner* — Nizam U Ahmed
(74) *Attorney, Agent, or Firm* — Lando & Anastasi, LLP

(57) ABSTRACT

Multi-band RF front-end modules, and wireless devices incorporating same, having a multi-feed antenna system and a plurality of dedicated antenna feed paths, each directly connected to the multi-feed antenna system and assigned to a different frequency band.

24 Claims, 9 Drawing Sheets

Legend
200- RF front-end module
212, 214, 216, 218 - dedicated antenna feed paths
220 - antenna system
232 - transmit filter
234 - receive filter
236a, 236b, 236c, 236d - filter
242 - low noise amplifier
252 - power amplifier

RF FRONT-END WITH FILTER-BASED INTERFACE TO MULTI-FEED ANTENNA

CROSS-REFERENCE TO RELATED APPLICATIONS

This application claims priority under 35 U.S.C. § 119 (e) to U.S. Provisional Patent Application Ser. No. 62/867,474, titled "RF FRONT-END WITH FILTER-BASED INTERFACE TO MULTI-FEED ANTENNA," filed Jun. 27, 2019 and to U.S. Provisional Patent Application Ser. No. 62/899,239, titled "RF FRONT-END WITH FILTER-BASED INTERFACE TO MULTI-FEED ANTENNA," filed Sep. 12, 2019, each of which is being incorporated herein in its entirety for all purposes.

BACKGROUND

Conventional antenna interfacing for multiple different communication bands is based on fixed filtering and static radio frequency (RF) signal paths that are designed for specific frequency bands, impedance matching, and transmit/receive support. In order to support many of these fixed filter-based RF paths, switches are used to selectively connect active paths to the antenna system in turn. RF front-end architectures often combine or "merge" RF paths to a shared antenna feed through any of various techniques, including permanently "ganging" the filters together to a shared RF signal line, "switch-combining" to selectively engage simultaneous active throws of the combining switch in order to connect multiple RF paths to a shared antenna feed, or the use of additional diplexer, triplexer, or other similar filtering devices to merge the signal paths. Each of these techniques incurs additional loading loss when multiple filters are connected together. Furthermore, when additional filters are used in series, these losses cascade through the merged signal paths.

SUMMARY OF THE INVENTION

Aspects and embodiments are directed to alleviating the loss and signal interference issues caused by merging multiple signal paths together through antenna switches and/or duplexers. According to certain embodiments, there are provided RF front-end architectures that leverage advantages gained by "bypassing" the additional loss typically associated with antenna switches where merged signal paths are not required.

According to one embodiment, a front-end module comprises a multi-feed antenna system, a filtering module including a first bandpass filter device and a second bandpass filter device, a first dedicated antenna feed path directly connected to the first bandpass filter device and to the multi-feed antenna system, and a second dedicated antenna feed path directly connected to the second bandpass filter device and to the multi-feed antenna system.

In one example, the first bandpass filter device includes a first transmit filter having a first transmit passband and a first receive filter having a first receive passband, and wherein the second bandpass filter device includes a second transmit filter having a second transmit passband different from the first transmit passband and a second receive filter having a second receive passband different from the first receive passband. In one example, the front-end module further comprises a first power amplifier connected to the first transmit filter, a first low noise amplifier connected to the first receive filter, a second power amplifier connected to the second transmit filter, and a second low noise amplifier connected to the second receive filter. In another example, the front-end module further comprises a transmit band-select switch coupled to the first and second transmit filters, a power amplifier connected to the transmit band-select switch, the transmit band-select switch being configured to selectively connect one of the first and second transmit filters to the power amplifier, a receive band-select switch coupled to the first and second receive filters, and a low-noise amplifier connected to the receive band-select switch, the receive band-select switch being configured to selectively connect one of the first and second receive filters to the low noise amplifier. In one example, there is no overlap in frequency among the first transmit band and the second transmit band, and wherein there is no overlap in frequency among the first receive band and the second receive band.

The front-end module may further comprise a time division duplex filter, a third dedicated antenna feed path directly connected to the multi-feed antenna system and to the time division duplex filter, a fourth dedicated antenna feed path directly connected to the time division duplex filter and to the multi-feed antenna system, a power amplifier, and a band-select switch configured to selectively connect the power amplifier to one of the third and fourth dedicated antenna feed paths. In one example, the first dedicated antenna feed path is assigned to a first transmit frequency band, the second dedicated antenna feed path is assigned to a second transmit frequency band, the third dedicated antenna feed path is assigned to a third transmit frequency band, and the fourth dedicated antenna feed path is assigned to a fourth transmit frequency band, the third and fourth transmit frequency bands being higher in frequency than the first and second transmit frequency bands and there being no overlap in frequency between the first and second transmit frequency bands, wherein the first bandpass filter device includes a first transmit filter having a first transmit passband corresponding to the first transmit frequency bands, and the second bandpass filter device includes a second transmit filter having a second transmit passband corresponding to the second transmit frequency band. In another example, the power amplifier is a high-band power amplifier, the band-select switch is a high-band band-select switch. The front-end module may further comprise a low-band power amplifier, and a low-band transmit band-select switch coupled to the low-band power amplifier and to the first and second band-pass filter devices, the low-band transmit band-select switch being configured to selectively connect the low-band power amplifier to one of the first and second transmit filters. In one example, the front-end module further comprises a high-band low noise amplifier coupled to the high-band band-select switch. In another example, the first bandpass filter device further includes a first receive filter having a first receive passband, and the second bandpass filter device further includes a second receive filter having a second receive passband different from the first receive passband. In another example, the front-end module further comprises a low-band low noise amplifier, and a low-band receive band-select switch configured to selectively connect the low-band low noise amplifier to one of the first and second receive filters.

In one example, the multi-feed antenna includes a first test connector coupled to the first dedicated antenna feed path for measuring an impedance of the first dedicated antenna feed path, and a second test connector coupled to the second dedicated antenna feed path for measuring an impedance of the second dedicated antenna feed path.

According to another embodiment, a front-end module comprises a multi-feed antenna system, a plurality of dedicated antenna feed paths, each directly connected to the multi-feed antenna system and assigned to a respective frequency band, and a filtering module including a corresponding plurality of bandpass filter devices, each bandpass filter device connected in a respective one of the plurality of dedicated antenna feed paths and having a passband corresponding to the respective frequency band of the dedicated antenna feed path in which the bandpass filer device is connected, there being no overlap in frequency among the respective frequency bands.

In one example, each bandpass filter device includes a transmit filter having a transmit passband and a receive filter having a receive passband.

The front-end module may further comprise a power amplifier module including a corresponding plurality of power amplifiers, each power amplifier connected to the transmit filter of a respective one of the plurality of bandpass filter devices, and a low noise amplifier module including a corresponding plurality of low noise amplifiers, each low noise amplifier connected to the receive filter of the respective one of the plurality of bandpass filter devices.

In another example, the front-end module further comprises a transmit band-select switch coupled to the transmit filter of each of plurality of bandpass filter devices, and a power amplifier connected to the transmit band-select switch, the transmit band-select switching being configured to selectively connect the transmit filter of a selected one of the plurality of bandpass filter devices to the power amplifier. The front-end module may further comprise a receive band-select switch coupled to the receive filter of each of plurality of bandpass filter devices, and a low noise amplifier connected to the receive band-select switch, the receive band-select switching being configured to selectively connect the receive filter of a selected one of the plurality of bandpass filter devices to the low noise amplifier.

In one example, the multi-feed antenna system includes a corresponding plurality of test connectors, each test connector coupled to a respective one of the plurality of dedicated antenna feed paths and configured for measuring an impedance of the corresponding dedicated antenna feed path.

In another example, the multi-feed antenna system includes a patch antenna array.

According to another embodiment, a front-end module comprises a multi-feed antenna system, a plurality of low-band dedicated antenna feed paths, each directly connected to the multi-feed antenna system and assigned to a respective low-band frequency band, and a low-band filtering module including a corresponding plurality of bandpass filter devices, each bandpass filter device connected in a respective one of the plurality of low-band dedicated antenna feed paths and having a passband corresponding to the respective low-band frequency band of the low-band dedicated antenna feed path in which the bandpass filer device is connected, there being no overlap in frequency among the respective low-band frequency bands. The front-end module further comprises a low-band band-select switch coupled to the low-band filtering module, and a low-band power amplifier connected to the low-band band-select switch, the low-band band-select switch being configured to selectively connect the low-band power amplifier to a selected one of the bandpass filter devices. The front-end module further comprises a plurality of high-band dedicated antenna feed paths, each directly connected to the multi-feed antenna system and assigned to a respective high-band frequency band, each of the high-band frequency bands being higher in frequency than all of the low-band frequency bands, a high-band band selected switch coupled to the plurality of high-band dedicated antenna feed paths, a time division duplex filter coupled between the high-band band-select switch and the multi-feed antenna system in each of the plurality of high-band dedicated antenna feed paths, and a high-band power amplifier connected to the high-band band-select switch, the high-band band-select switch being configured to selectively connect the high-band power amplifier to a selected one of the plurality of high-band dedicated antenna feed paths.

According to another embodiment, a wireless device comprises a multi-feed antenna system, a multi-band transceiver configured to produce a plurality of transmit signals in a corresponding plurality of different frequency bands to be transmitted by the multi-feed antenna system, a plurality of dedicated antenna feed paths, each directly connected to the multi-feed antenna system and assigned to a respective frequency band in the plurality of different frequency bands, each antenna feed path configured to direct a respective one of the plurality of transmit signals to the multi-feed antenna system, and a filtering module including a corresponding plurality of bandpass filter devices, each bandpass filter device connected in a respective one of the plurality of dedicated antenna feed paths between the transceiver and the multi-feed antenna system and having a passband corresponding to the respective frequency band of the dedicated antenna feed path in which the bandpass filer device is connected.

In one example, each bandpass filter device includes a transmit filter having a transmit passband configured to pass the corresponding transmit signal and a receive filter having a receive passband.

The wireless device may further comprise a power amplifier module including a corresponding plurality of power amplifiers, each power amplifier connected between the transceiver and the transmit filter of a respective one of the plurality of bandpass filter devices, and a low noise amplifier module including a corresponding plurality of low noise amplifiers, each low noise amplifier connected between the transceiver and the receive filter of the respective one of the plurality of bandpass filter devices. In one example, the wireless device further comprises an electromagnetic coupler coupled to the power amplifier module and configured to electromagnetically couple portions of the transmit signals from transmit signal paths extending between the power amplifier module and the filtering module to provide coupled signals, and a sensor module configured to receive the coupled signals from the electromagnetic coupler and to provide control signals to at least one of the transceiver and the power amplifier module based on the coupled signals.

In another example, the wireless device further comprises a power amplifier module including at least one power amplifier, a low noise amplifier module including at least one low noise amplifier, a transmit band-select switch configured to selectively connect the power amplifier module to the transmit filter of a selected one of the plurality bandpass filter devices, and a receive band-select switch configured to selectively connect the low noise amplifier module to the receive filter of the selected one of the plurality of bandpass filter devices. The wireless device may further comprise an electromagnetic coupler coupled to the power amplifier module and configured to electromagnetically couple portions of the transmit signals from transmit signal paths extending between the power amplifier module and the filtering module to provide coupled signals, and a sensor module configured to receive the coupled signals from the electromagnetic coupler and to provide control signals to at least one of the transceiver and the power amplifier module based on the coupled signals.

In one example, there is no overlap in frequency among the passbands of the plurality of bandpass filter devices.

In another example, the wireless device further comprises a power management system coupled to the transceiver and configured to manage power for operation of the wireless device. The wireless device may further comprise a baseband sub-system coupled to the transceiver, a user interface connected to the baseband sub-system, and a memory connected to the baseband sub-system and configured to store data.

In another example, the multi-feed antenna system includes a patch antenna array.

Still other aspects, embodiments, and advantages of these exemplary aspects and embodiments are discussed in detail below. Embodiments disclosed herein may be combined with other embodiments in any manner consistent with at least one of the principles disclosed herein, and references to "an embodiment," "some embodiments," "an alternate embodiment," "various embodiments," "one embodiment" or the like are not necessarily mutually exclusive and are intended to indicate that a particular feature, structure, or characteristic described may be included in at least one embodiment. The appearances of such terms herein are not necessarily all referring to the same embodiment.

BRIEF DESCRIPTION OF THE DRAWINGS

Various aspects of at least one embodiment are discussed below with reference to the accompanying figures, which are not intended to be drawn to scale. The figures are included to provide illustration and a further understanding of the various aspects and embodiments, and are incorporated in and constitute a part of this specification, but are not intended as a definition of the limits of the invention. In the figures, each identical or nearly identical component that is illustrated in various figures is represented by a like numeral. For purposes of clarity, not every component may be labeled in every figure. In the figures.

DETAILED DESCRIPTION

Figure 1A:
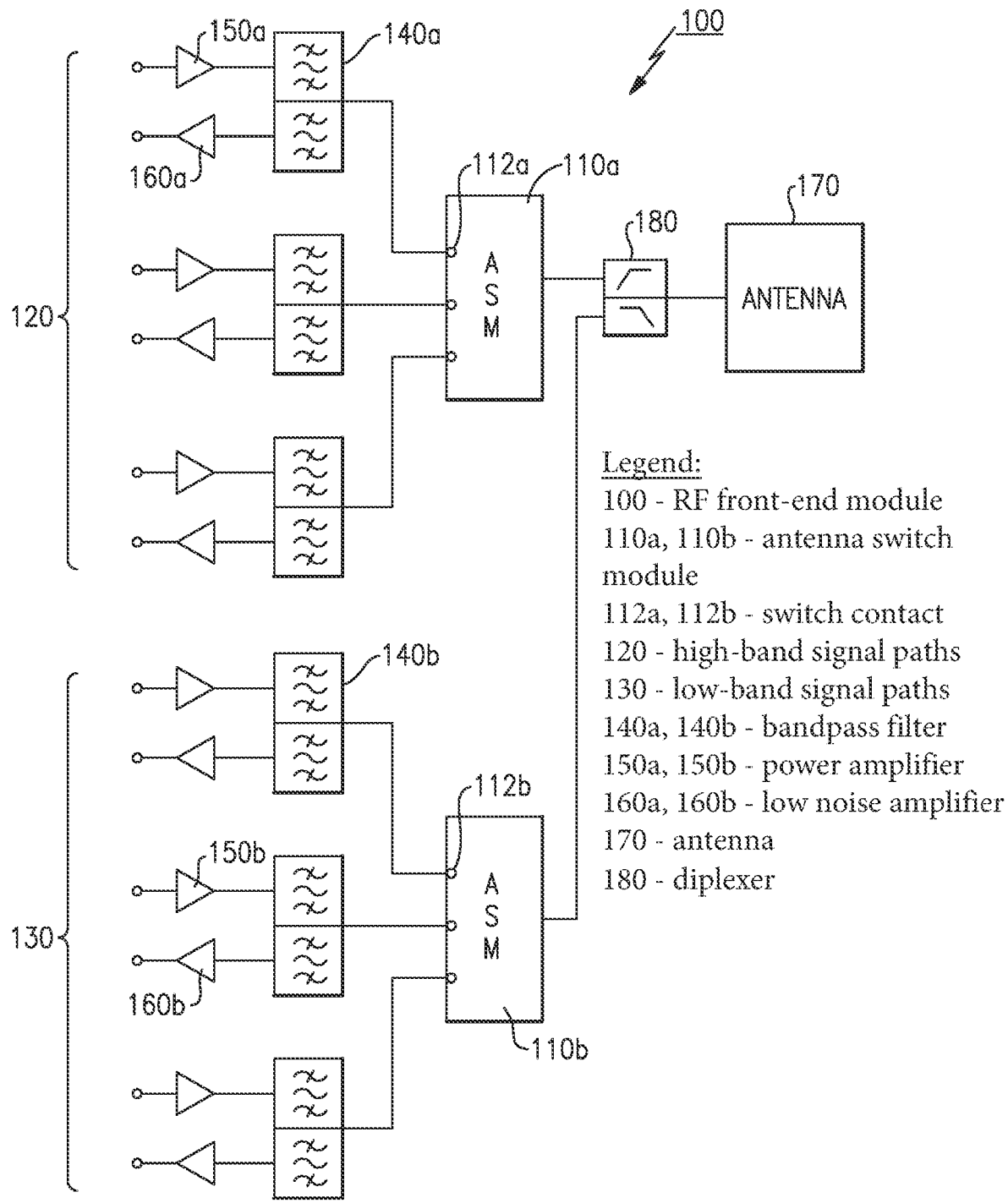
FIG. 1A is a block diagram of a conventional RF front-end module including antenna switches.

As discussed above, for multi-band RF communications devices, the front-end module typically includes antenna switches and diplexers, triplexers, or similar devices that merge the signal paths for different signal bands together. For example, FIG. 1A is a block diagram showing an example of a conventional RF front-end architecture. In this example, the RF front-end module 100 includes two antenna switch modules 110, namely, a first antenna switch module (ASM) 110a for a collection of merged high-band signal paths 120 and a second ASM 110b for a collection of merged low-band signal paths 130. The collection of merged high-band signal paths 120 includes a plurality of high-band transmit paths and a plurality of high-band receive paths. Pairs of the high-band transmit paths and high-band receive paths are coupled to a common respective switch contact 112a of the first ASM 110a by a bandpass filtering device 140a, such as a duplexer, as shown in FIG. 1A. Each high-band transmit path includes a power amplifier 150a, and each high-band receive path includes a low noise amplifier 160a. The same arrangement exists for the collection of low-band signal paths 130. Pairs of the low-band transmit paths and high-band receive paths are coupled to a common respective switch contact 112b of the second ASM 110b by a bandpass filtering device 140b, such as a duplexer. Each low-band transmit path includes a power amplifier 150b, and each low-band receive path includes a low noise amplifier 160b. The antenna switch modules 110a, 110b are coupled to a shared antenna 170 by a diplexer 180.

Figure 1B:
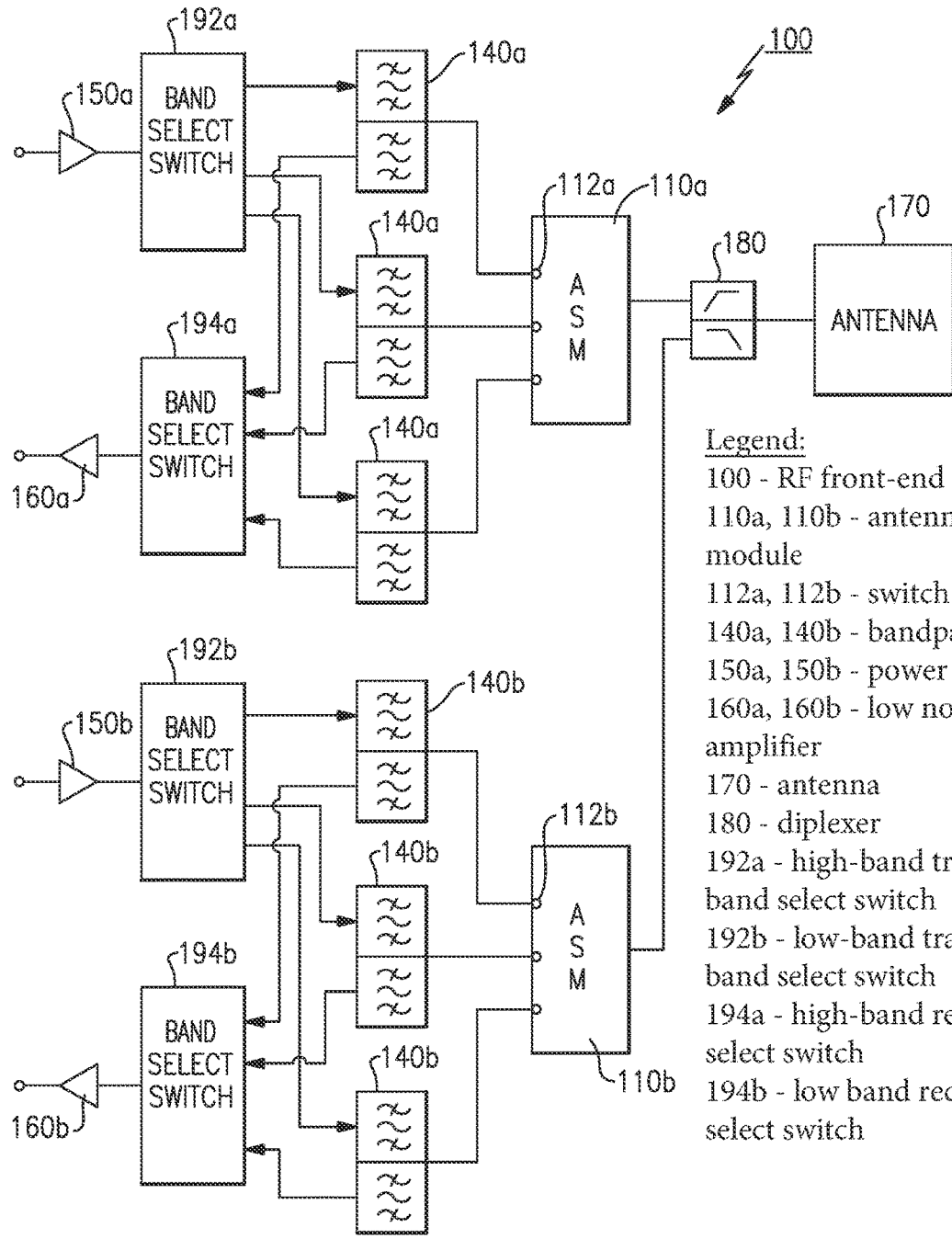
FIG. 1B is a block diagram of a conventional RF front-end module including antenna switches and high-band and low-band select switches.

In the example shown in FIG. 1A, each bandpass filtering device 140a, 140b is shown connected to an individual power amplifier 150a or 150b, respectively, and an individual low noise amplifier 160a or 160b, respectively. However, in other examples, a single high-band power amplifier 150a may be shared among multiple high-band transmit paths, and a single high-band low noise amplifier 160a may be shared among multiple high-band receive paths. Similarly, a single low-band power amplifier 150b may be shared among multiple low-band transmit paths, and a single low-band low noise amplifier 160b may be shared among multiple low-band receive paths. An example of such an arrangement is shown in FIG. 1B. In this example, the high-band transmit paths are connected between the high-band filtering devices 140a and a high-band transmit band select switch 192a, and the high-band receive paths are connected between the high-band filtering devices 140a and a high-band receive band select switch 194a. The high-band transmit band select switch 192a connects any selected one of the high-band transmit paths to a high-band power amplifier 150a, and the high-band receive band select switch 194a connects any selected one of the high-band receive paths to a high-band low noise amplifier 160a. Similarly, the low-band transmit paths are connected between the low-band filtering devices 140b and a low-band transmit band select switch 192b, and the low-band receive paths are connected between the low-band filtering devices 140b and a low-band receive band select switch 194b. The low-band transmit band select switch 192b connects any selected one of the low-band transmit paths to a low-band power amplifier 150b, and the low-band receive band select switch 194b connects any selected one of the low-band receive paths to a low-band low noise amplifier 160b.

Figure 1C:
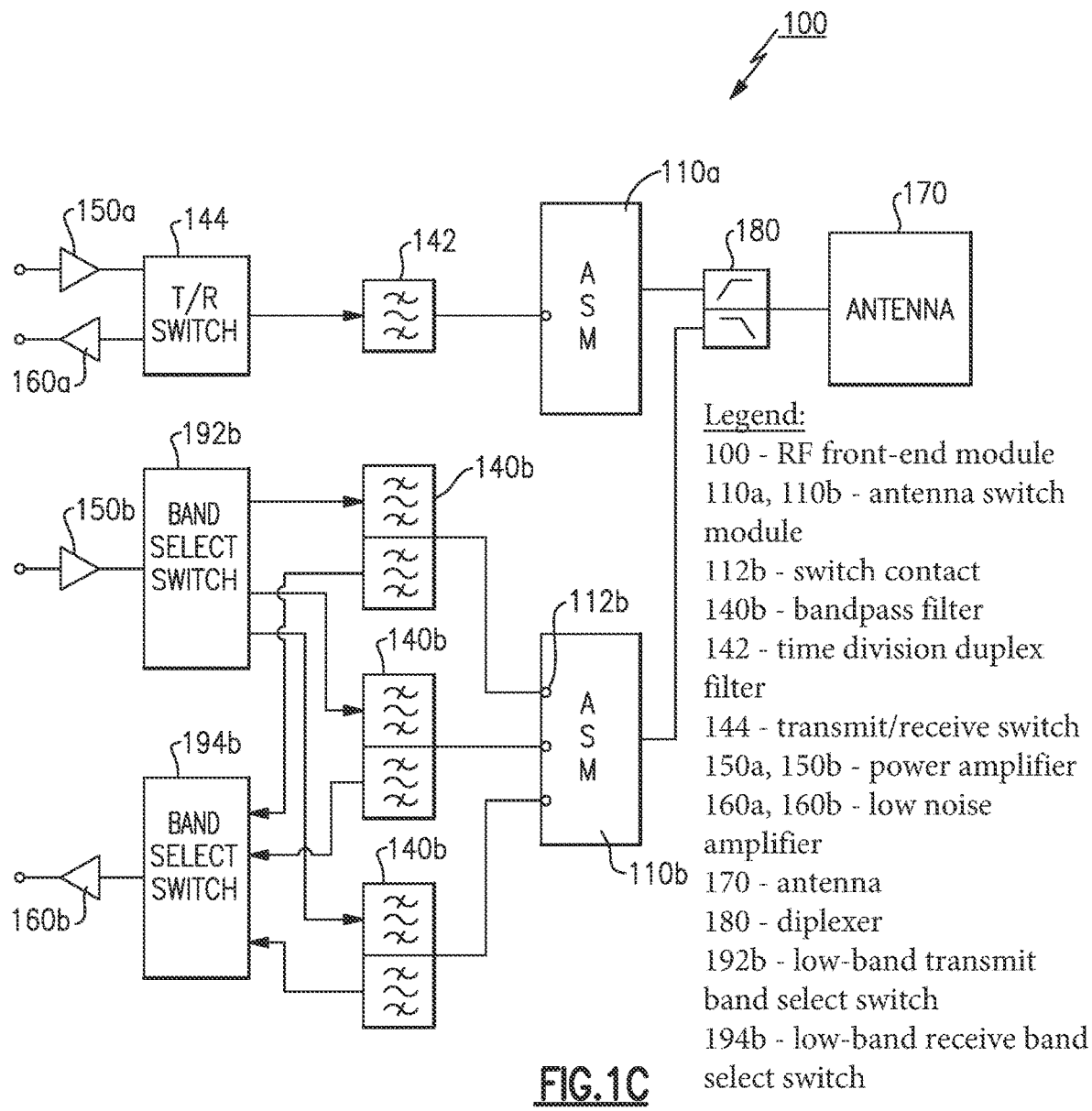
FIG. 1C is a block diagram of a conventional RF front-end module including antenna switches, a high-band time division duplex filter, and low-band select switches.

In other examples, a time division duplex (TDD) filter can be used in one or more high-band paths. For example, referring to FIG. 1C, a TDD filter 142 may be connected between the high-band antenna switch module 110a and a transmit/receive switch 144. The transmit/receive switch 144 connects either the high-band power amplifier 150a or the high-band low noise amplifier 160a to the TDD filter 142. Although only one TDD filter 142 and one transmit/receive switch 144 are shown in FIG. 1C, those skilled in the art will appreciate, given the benefit of this disclosure, that multiple ones of either (or both) components may be included to accommodate multiple high-band transmit and/or receive paths. In certain examples, the transmit/receive switch 144 may be combined with one of the high-band band select switches 192a, 194a shown in FIG. 1B to accommodate multiple transmit and/or receive paths.

In the examples shown in FIGS. 1A-C, the collections of high-band signal paths 120 and low-band signal paths 130 include three pairs of transmit and receive paths; however, this is merely illustrative. There may be more or fewer pairs of high-band or low-band transmit and receive paths, and the collection of high-band signal paths 120 need not include the same number of signal paths as the collection of low-band signal paths 130. Further, the transmit and receive paths need not be grouped in pairs; multiple transmit and/or receive paths in either frequency band may be coupled to any of the switch contacts 112 using the bandpass filtering devices 140a, 140b. In addition, although not shown in FIGS. 1A-C, in some examples, the RF front-end module 100 may also include a collection of mid-band signal paths that are coupled to the antenna 170 either via a third ASM 110 or using the first ASM 110a and/or second ASM 110b. Thus, the examples shown in FIGS. 1-C are merely intended to illustrate that in conventional multi-band RF front-end modules, numerous signal paths (transmit and/or receive) corresponding to different frequency ranges (sub-bands) are merged through one or more antenna switches (e.g., ASM 110a, ASM 110b) and the diplexer 180 (or a similar device, such a triplexer) to the shared antenna 170. The diplexer 180 and the antenna switches introduce loss into the signal paths, which may degrade the performance of the RF front-end module.

Figure 2A:
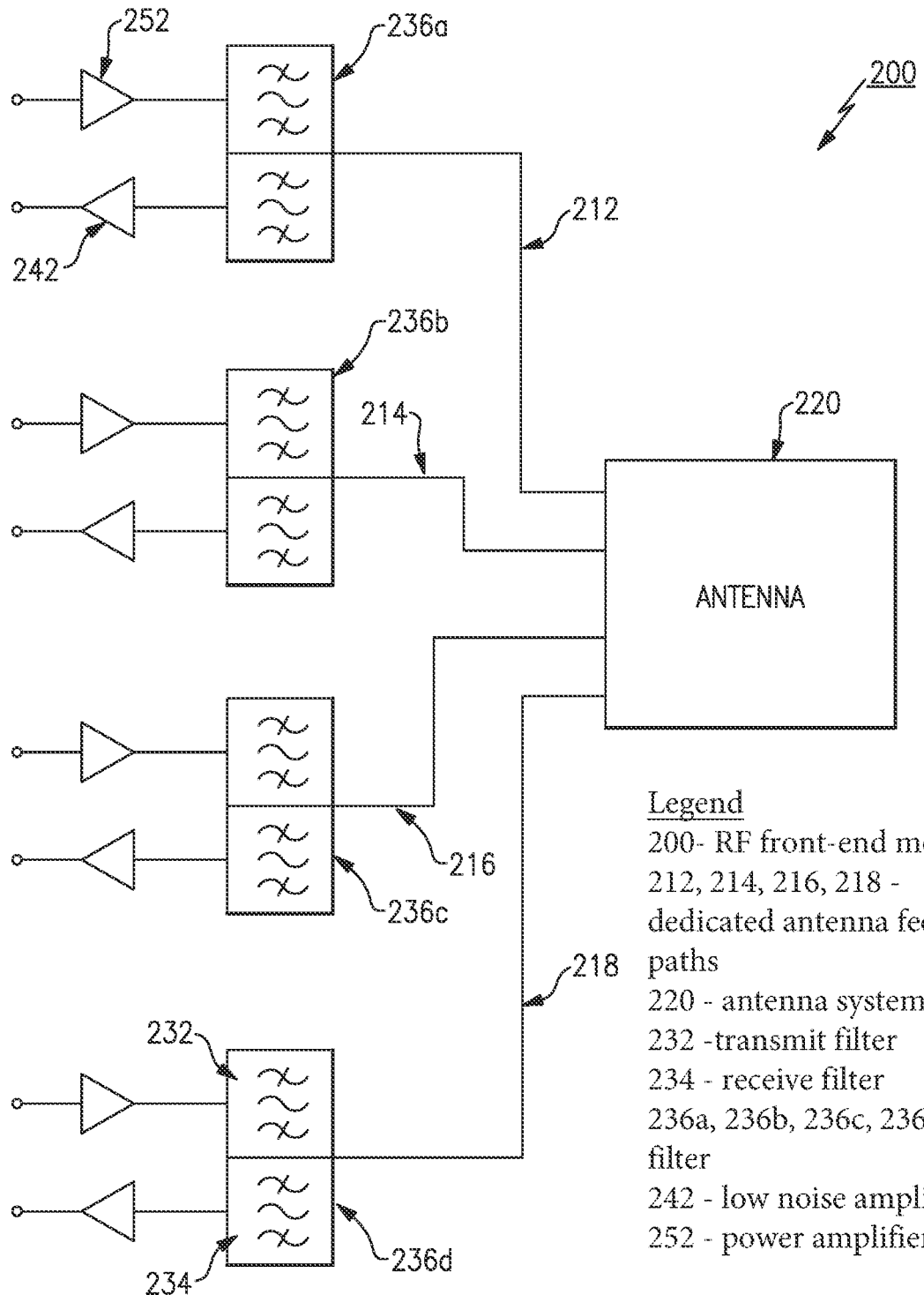
FIG. 2A is a block diagram of one example of an RF front-end module according to aspects of the present invention.

Aspects and embodiments of the present disclosure address these issues by providing an RF front-end architecture in which dedicated antenna feed paths are provided for different frequency bands, rather than merging multiple paths through antenna switches. An example of this concept is illustrated in FIG. 2A, which shows an example of a multi-band RF front-end module 200 including a multiple-feed antenna system 220 whose connectivity to the active circuits and filters of the RF front-end module 200 is achieved by dedicating a particular antenna feed path for a given frequency band, without the requirement for an antenna switch module. In the example shown in FIG. 2A, the RF front-end module 200 includes four dedicated antenna feed paths 212, 214, 216, 218, each for a given frequency band; however, this example is intended to be illustrative only and non-limiting. Embodiments of the RF front-end module 200 may include any number of dedicated antenna feed paths, for example, depending on the number of frequency bands over which the RF front-end module 200 and antenna system 220 are intended to operate.

A filter device 236 is connected directly on each dedicated antenna feed path 212, 214, 216, 218. The filter device 236 may be a bandpass filter configured to pass signals in the frequency band corresponding to the dedicated antenna feed path 212, 214, 216, 218 in which the filter device is connected. In the example shown in FIG. 2A, the antenna system 220 is used for both transmit and receive functions, and therefore, each dedicated antenna feed path 212, 214, 216, 218 accommodates both signals to be transmitted by the antenna system 220 and signals received by the antenna system 220 and being directed via the RF front-end module 200 to receiver circuitry (not shown) in the device in which the RF front-end module is to be used. Accordingly, in this example, each filter device 236 includes a transmit filter 232 and a receive filter 234. Signals received from the antenna system 220 are filtered by the receive filter 234 and amplified by a low noise amplifier 242. Signals to be transmitted by the antenna system 220 are received from a power amplifier 252, filtered by the transmit filter 232, and directed along the respective antenna feed path 212, 214, 216, 218 to the antenna system 220. For signals that are out-of-band of the respective filter device 236, a highly reflective impedance is presented. The filter device 236 may be supplemented with a shorting switch to ground or low-loss series switch to ensure that only signals in the targeted frequency range of the filter passband are enabled on each respective antenna feed path. The filter devices 236, along with any supplemental switch(es), on each dedicated antenna feed path 212, 214, 216, 218 can be configured such that signals in all other active frequency bands presented to the antenna system 220 (e.g., those corresponding to others of the antenna feed paths) do not incur substantial loading loss.

Figure 2B:
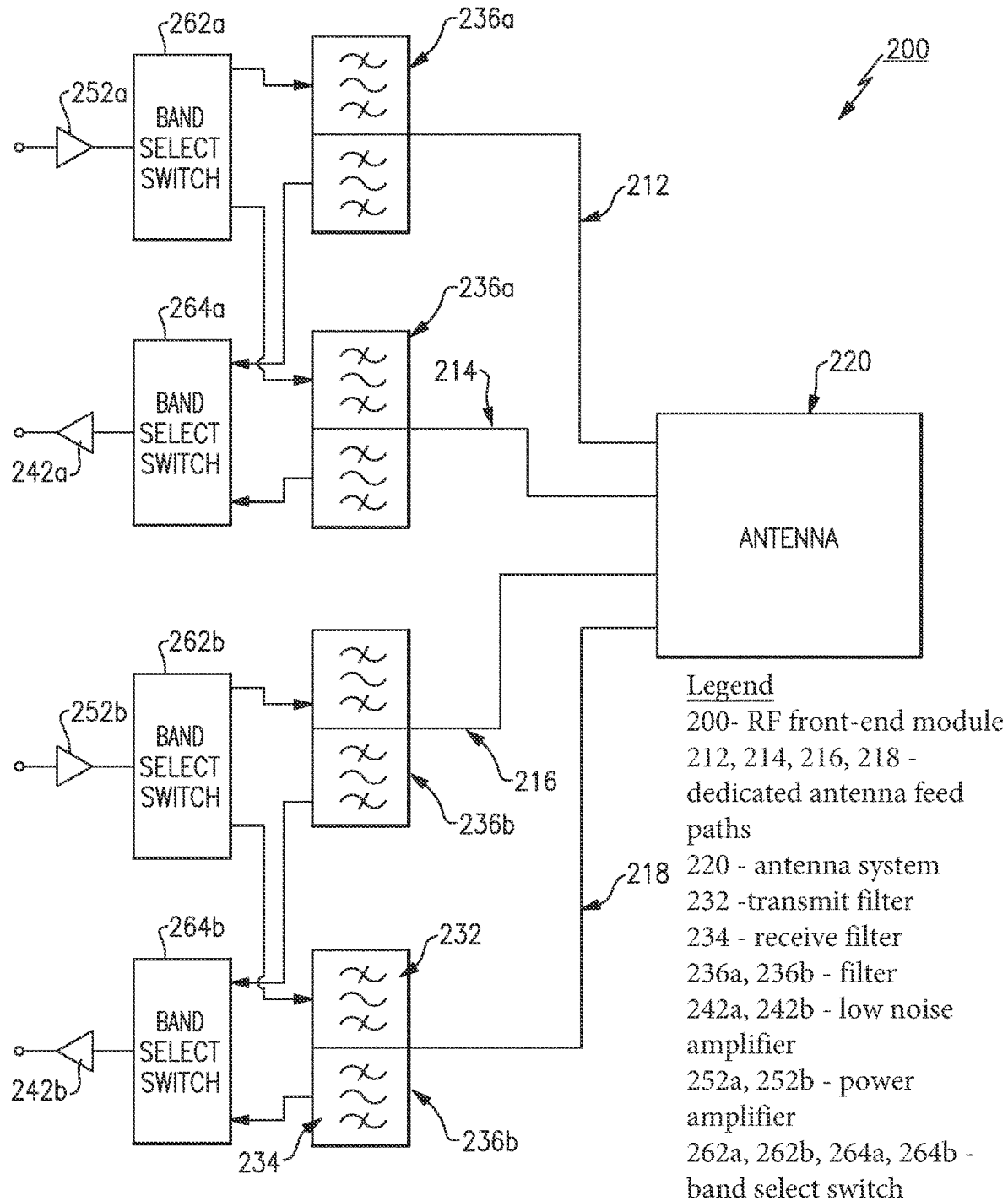
FIG. 2B is a block diagram of another example of an RF front-end module according to aspects of the present invention.

As discussed above, the RF front-end module 200 may have a variety of different configurations and arrangements. For example, FIG. 2B illustrates an example in which band select switches are used to share the power amplifier 252 and low noise amplifier 242 among multiple transmit and receive paths, respectively. Referring to FIG. 2B, in this example, the RF front-end module 200 includes two high-band antenna feed paths 212, 214, and two low-band antenna feed paths 216, 218. A high-band transmit band select switch 262a is used to share a common high-band power amplifier 252a among the high-band transmit paths, and a high-band receive band select switch 264a is used to share a common high-band low noise amplifier 242a among the high-band receive paths. Similarly, a low-band transmit band select switch 262b is used to share a common low-band power amplifier 252b among the low-band transmit paths, and a low-band receive band select switch 264b is used to share a common low-band low noise amplifier 242b among the low-band receive paths. In the example shown in FIG. 2B, the RF front-end module 200 includes two high-band paths and two low-band paths; however, those skilled in the art will appreciate that any number of high-band paths and any number of low-bands paths (the numbers not necessarily being equal) may be present.

Figure 2C:
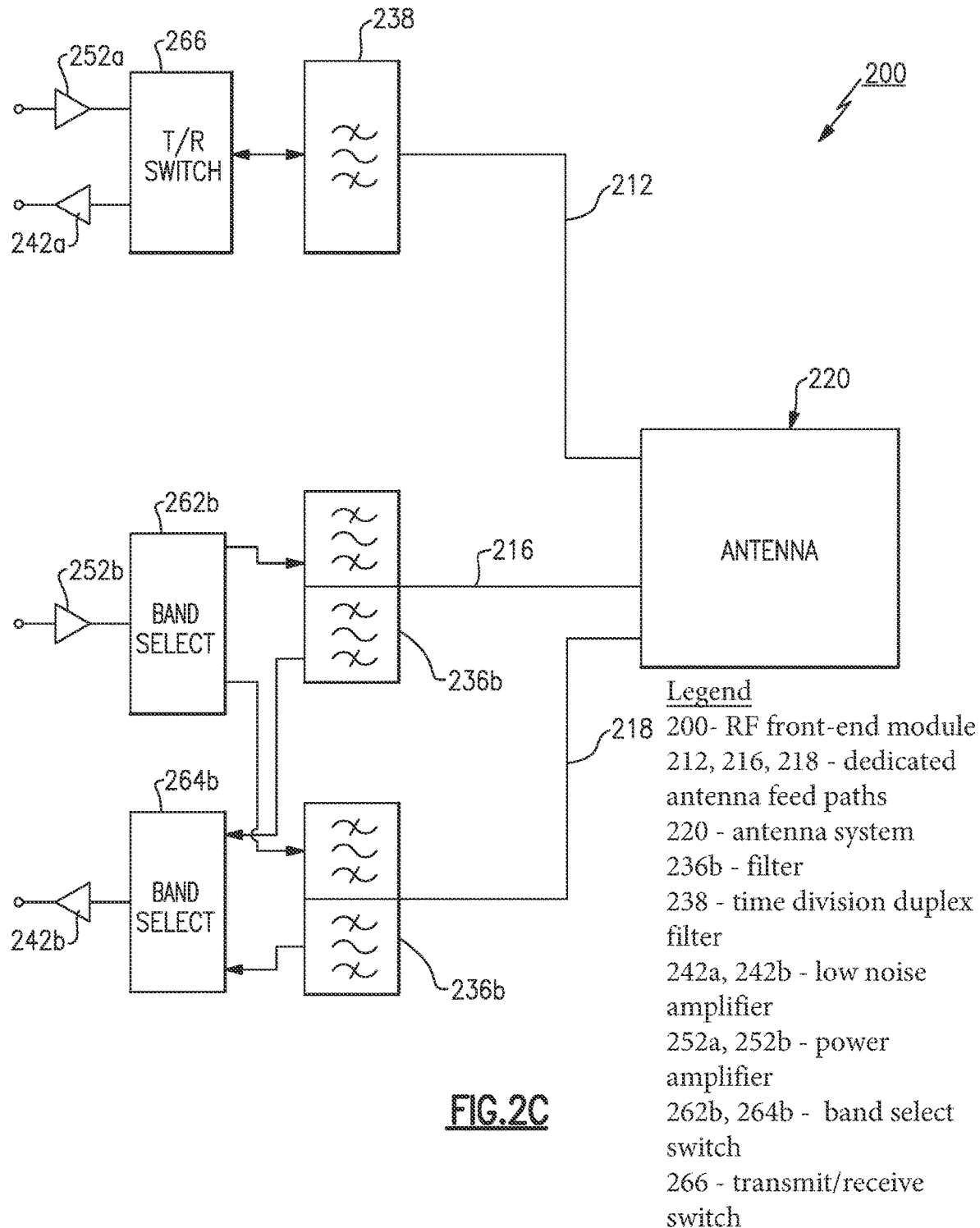
FIG. 2C is a block diagram of another example of an RF front-end module according to aspects of the present invention.

In addition, in certain examples, as discussed above, one or more TDD filters may be used in another configuration. Referring to FIG. 2C, in this example the high-band antenna feed path 212 is coupled to a TDD filter 238 that is connected to a switch 266. The switch 266 is a transmit/receive switch that is configured to switch between a transmit mode (in which the high-band power amplifier 252a is connected) and a receive mode (in which the high-band low noise amplifier 242a is connected). As discussed above, in the illustrated example, the RF front-end module includes one high-band antenna feed path 212; however, in other examples, there may be more high-band paths to accommodate additional high-band frequency bands, all or some of which may implement a TDD filter similar to the TDD filter 238 and connect to the shared switch 266, or alternatively implement frequency domain division (FDD) duplexer connectivity as discussed above.

Figure 2D:
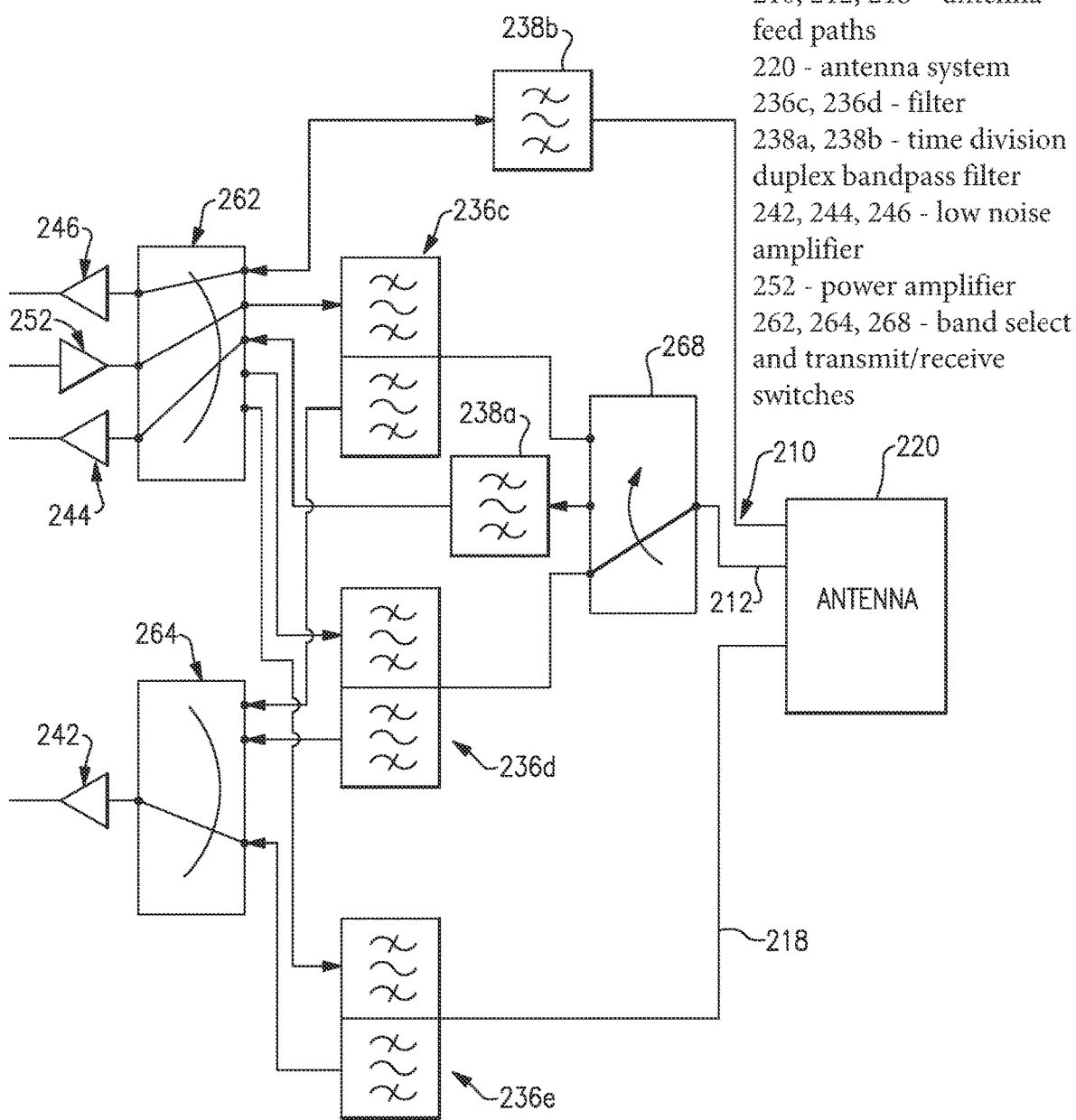
FIG. 2D is a block diagram of another example of an RF front-end module according to aspects of the present invention.

In certain examples, the passbands of two or more of the filter devices 236 may overlap in frequency. In such cases, it is not advisable for these filter devices to be connected to the antenna 220 at the same time because they will concurrently load the antenna 220 at the same frequency and produce "draining" impedances that may interfere with the insertion loss and available power of the connections to the antenna 220. Accordingly, such filter devices 236 may be provided with switched connections to the antenna 220. FIG. 2D illustrates an example of such a configuration. Referring to FIG. 2D, a portion of the RF front-end module 200 is shown, with two filter devices 236c and 236d that have passbands (either transmit, receive, or both) that at least partially overlap in frequency. Accordingly, a switch 268 can be used to selectively connect only one of the three overlapping filter devices 236c, 236d, 238a to the antenna 220 at any one time. Any other filter devices 236e, 238b that do not overlap in frequency with other filter devices 236 may be concurrently connected to the antenna 220, as shown in FIG. 2D. In the example shown in FIG. 2D, there are three overlapping filter devices 236c, 236d, 238a that share the switch 268; however, in other examples, more than two overlapping filter devices 236 may be selectively individually connected to the antenna 220 using the switch 236, and/or one or more additional switches 268 may be used. In this example, the filters 236c, 236d are FDD duplexer filters, while filter 238a is a TDD bandpass filter. The band-select and transmit/receive (T/R) switch 262 indicates connectivity for the transmit power amplifier 252 to enable one of these three RF paths connected to antenna feed path 212 for transmission (as well as selectively connecting RF paths to antenna feed paths 210 and 218), and the additional low noise amplifiers 244, 246 are connected to be able to receive on the TDD shared RF paths connected to the filters 238a and 238b. Filter 238b represents a TDD filter that does not suffer overlap of its passband with the other filters in the illustrated example and can therefore be connected directly to the antenna feed to eliminate the loss and cost of the conventional switch, similar to the TDD path illustrated in FIG. 2C.

Figure 3:
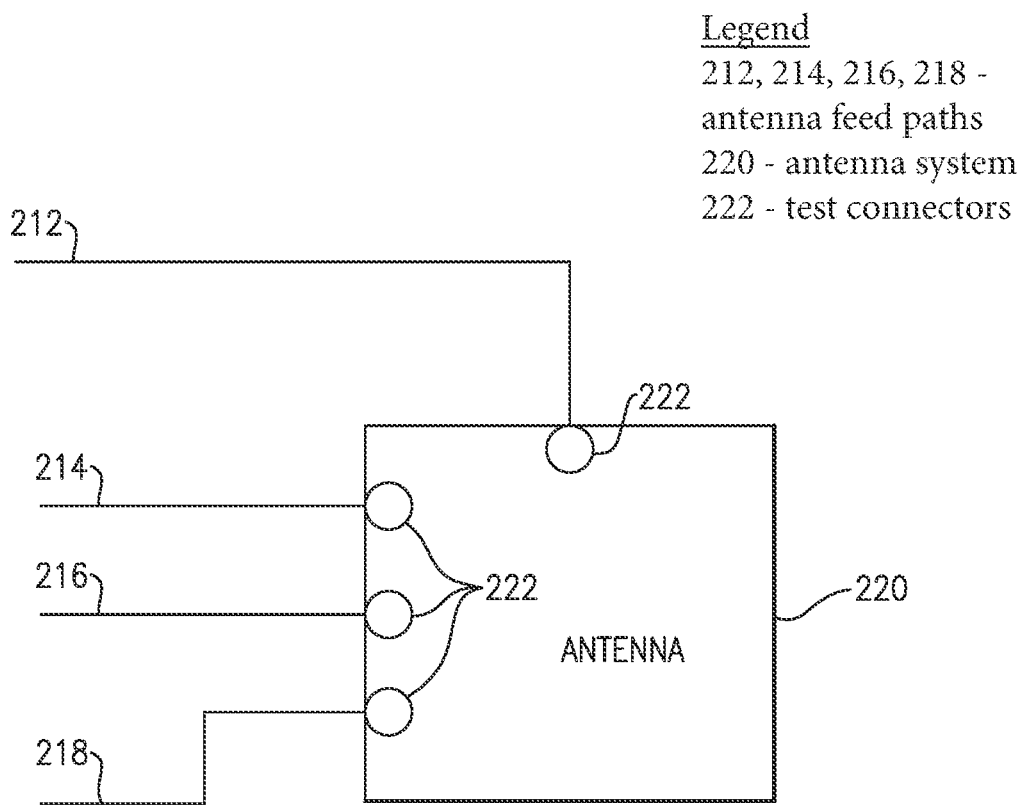
FIG. 3 is a block diagram of an example of a multi-feed antenna system according to aspects of the present invention.

Thus, aspects and embodiments provide configurations for an RF front-end module 200 in which multiple direct signal paths can be provided to a shared antenna, thereby reducing or eliminating the need for merging signal paths through an antenna switch module and minimizing the impact of each path (and components in that path) on the other signal paths. Advantages of this approach may include the removal of the antenna switch module, lower insertion loss in each signal path, and more flexible combinations of signal paths corresponding to specific frequency bands directly to the antenna system 220. In addition, isolation requirements of the filter devices 236 may be reduced because without merged signal paths, there may be less signal leakage or other interference in each path from other frequency bands. The approach may have a disadvantage in the number of signal routes to the antenna system 200, as well as the "geography" or layout of these routes on the module substrate, which may complicate the design and/or fabrication. In addition, in order to provide impedance conformance testing for each antenna feed path 212, 214, 216, 218, for example, to verify that each path presents a stable 50-ohm impedance, a test connector may be needed on each antenna feed path, rather than being able to use a single test connector on the antenna switch module. Accordingly, referring to FIG. 3, in certain examples, the antenna system 220 can be configured with multiple test connectors 222, one for each dedicated antenna feed path 212, 214, 216, 218. Although this may add components and some complexity, significant advantages may be gained, such as reduced insertion loss and/or reduced requirements on the filters 236, as discussed above. According to certain embodiments, the concept disclosed herein may be used selectively for specific frequency bands, for example, to allow the antenna system 220 to be shared across frequency bands that are difficult to combine using conventional merged signal paths (e.g., frequency bands with overlapping harmonics or bands located very close to one another in the spectrum) and with much lower loss. In certain examples, in addition to a plurality of dedicated, separate antenna feed paths as discussed above, the RF front-end module may also include two or more merged signal paths that are combined via an antenna switch and connected to the antenna system 220. Thus, a combination of approaches and connectivity to the antenna system 220 can be provided to allow for a flexible, high-performance RF front-end module that accommodates multiple different frequency bands with minimal insertion loss.

Figure 4:
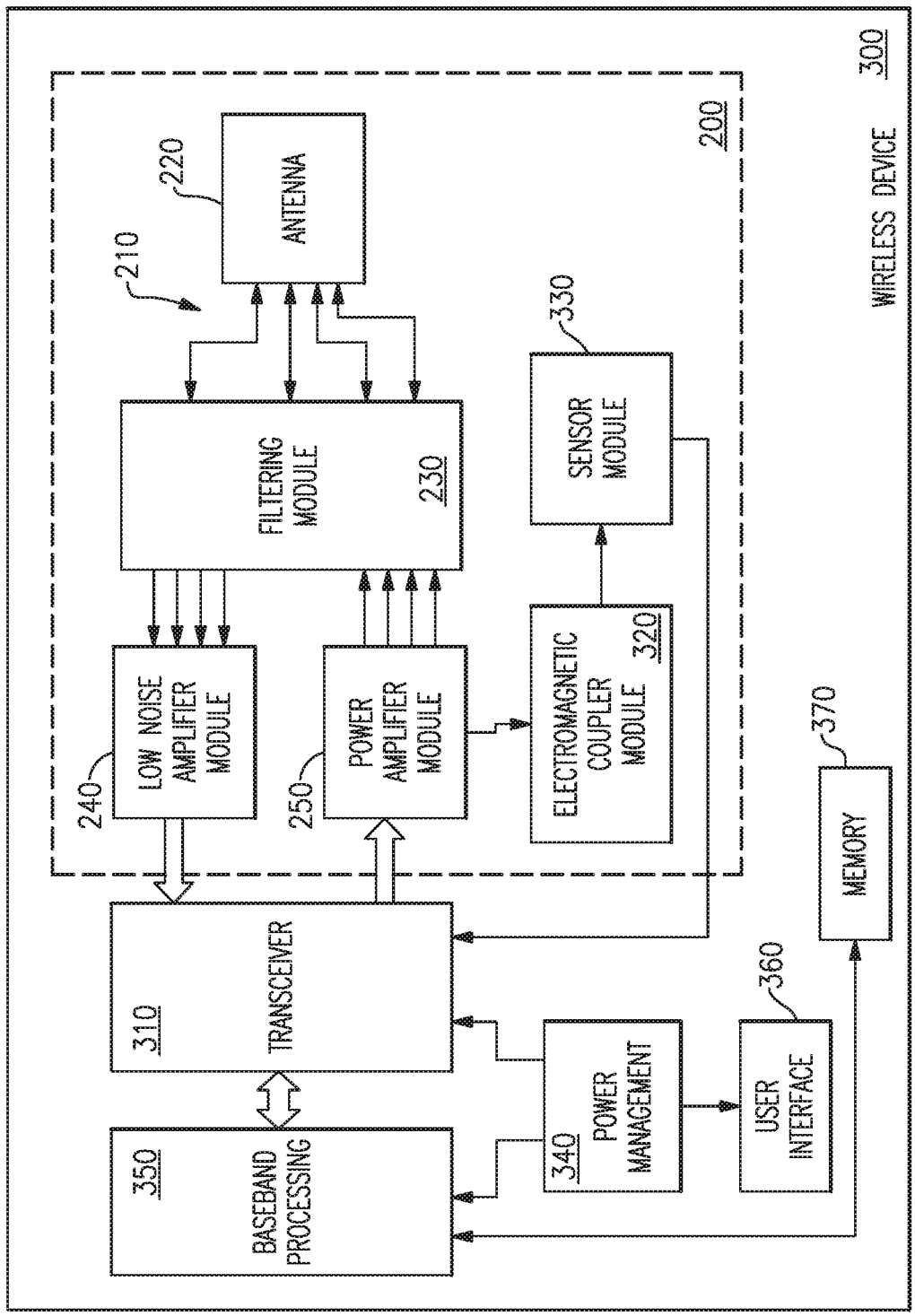
FIG. 4 is a block diagram of one example of a wireless device including a front-end module according to aspects of the present invention.

As discussed above, embodiments of the front-end module may be used in a wireless device. FIG. 4 is a block diagram of one example of a wireless device 300 including an example of the front-end module 200. The wireless device 300 can be a cellular phone, smart phone, tablet, modem, or any other portable or non-portable device configured for voice or data communications. The wireless device 300 includes an example of the RF front-end module 200 including the antenna system 220. The antenna system 220 may include any of a variety of antenna structures, including a patch antenna array, for example. The wireless device 300 can transmit and receive signals from the antenna system 220. As discussed above, the RF front-end module 200 includes multiple dedicated antenna feed paths 210 (e.g., the antenna feed paths 212, 214, 216, 218 shown in FIG. 2) that are directly connected to the antenna system 220 without an antenna switch module. The RF front-end module 200 further includes a filtering module 230 that includes the filter devices 236 for each of the antenna feed paths 210, as discussed above, and optionally one or more TDD filters 238 as discussed above. In addition, the RF front-end module 200 includes a power amplifier module 250 that includes the power amplifiers 252 in each transmit path and a low noise amplifier module 240 that includes the low noise amplifiers 242 in each receive path. In certain examples, the filtering module 230 may further include any of the switches 262, 264, 266, and/or 268 discussed above. Alternatively, the RF front-end module 200 may include a switching module (not shown in FIG. 4) that includes the switches 262, 264, 266, and/or 268, and/or some or all of the switches 262, 264, 266, and/or 268 may be incorporated within the low noise amplifier module 240 or the power amplifier module 250.

Referring to FIG. 4, the wireless device 300 includes a transceiver 310, which may incorporate transmitter circuitry and receiver circuitry. The transceiver 310 is configured to generate signals for transmission and/or to process received signals. Signals generated for transmission are received by the power amplifier module 250, which amplifies the generated signals from the transceiver 310. Received signals are amplified by the low noise amplifier (LNA) module 240 and then provided to the transceiver 310. In certain examples, the antenna system 220 both receives signals that are provided to the transceiver 310 via the filtering module 230 and the low noise amplifier module 240 and also transmits signals from the wireless device 300 via the transceiver 310, the power amplifier module 250, and the filtering module 230. However, in other examples multiple antennas can be used.

The power amplifier module 250 can be used to amplify a wide variety of RF or other frequency-band transmission signals. For example, the power amplifier module 250 can receive an enable signal that can be used to pulse the output of the power amplifier to aid in transmitting a wireless local area network (WLAN) signal or any other suitable pulsed signal. The power amplifier module 250 can be configured to amplify any of a variety of types of signal, including, for example, a Global System for Mobile (GSM) signal, a code division multiple access (CDMA) signal, a W-CDMA signal, a Long Term Evolution (LTE) signal, or an EDGE signal. In certain embodiments, the power amplifier module 250 and associated components including switches and the like can be fabricated on GaAs substrates using, for example, pHEMT or BiFET transistors, or on a Silicon substrate using CMOS transistors.

In certain embodiments, the wireless device 300 includes an electromagnetic coupler module 320 (also referred to as a directional coupler), which may be part of the RF front-end module 200. The directional coupler 320 can be used to extract a portion of the power from the RF signals traveling between the power amplifier module 250 and the antenna system 220 and provide the coupled signal(s) to a sensor module 330. The sensor module 330 may send information to the transceiver 310 and/or directly to the power amplifier module 250 as feedback for making adjustments to regulate the output power level of the power amplifier module 250. In certain embodiments in which the wireless device 300 is a mobile phone having a time division multiple access (TDMA) architecture, the directional coupler 320 can advantageously manage the amplification of an RF transmitted power signal from the power amplifier module 250. In a mobile phone having a time division multiple access (TDMA) architecture, such as those found in Global System for Mobile Communications (GSM), code division multiple access (CDMA), and wideband code division multiple access (W-CDMA) systems, the power amplifier module 250 can be used to shift power envelopes up and down within prescribed limits of power versus time. For instance, a particular mobile phone can be assigned a transmission time slot for a particular frequency channel. In this case the power amplifier module 250 can be employed to aid in regulating the power level one or more RF power signals over time, so as to prevent signal interference from transmission during an assigned receive time slot and to reduce power consumption. In such systems, the directional coupler 320 can be used to measure the power of a power amplifier output signal to aid in controlling the power amplifier module 250, as discussed above.

The wireless device 300 further includes a power management system 340 that is connected to the transceiver 310 and that manages the power for the operation of the wireless device 300. The power management system 340 can also control the operation of baseband processing circuitry 350 and other components of the wireless device 300. The power management system 340 provides power to the various components of the wireless device 300. Accordingly, in certain examples the power management system 340 may include a battery. Alternatively, the power management system 340 may be coupled to a battery (not shown).

In certain embodiments the baseband sub-system 350 is connected to a user interface 360 either directly or via the power management system 340 to facilitate various input and output of voice and/or data provided to and received from the user. The baseband sub-system 350 can also be connected to a memory 370 that is configured to store data and/or instructions to facilitate the operation of the wireless device 300, and/or to provide storage of information for the user.

Having described above several aspects of at least one embodiment, it is to be appreciated various alterations, modifications, and improvements will readily occur to those skilled in the art. Such alterations, modifications, and improvements are intended to be part of this disclosure and are intended to be within the scope of the invention. It is to be appreciated that embodiments of the methods and apparatuses discussed herein are not limited in application to the details of construction and the arrangement of components set forth in the foregoing description or illustrated in the accompanying drawings. The methods and apparatuses are capable of implementation in other embodiments and of being practiced or of being carried out in various ways. Examples of specific implementations are provided herein for illustrative purposes only and are not intended to be limiting. Also, the phraseology and terminology used herein is for the purpose of description and should not be regarded as limiting. The use herein of "including," "comprising," "having," "containing," "involving," and variations thereof is meant to encompass the items listed thereafter and equivalents thereof as well as additional items. References to "or" may be construed as inclusive so that any terms described using "or" may indicate any of a single one, more than one, and all of the described terms. Accordingly, the foregoing description and drawings are by way of example only, and the scope of the invention should be determined from proper construction of the appended claims, and their equivalents.

What is claimed is:

1. A front-end module comprising:
a multi-feed antenna;
a filtering module including a first bandpass filter device and a second bandpass filter device, the first bandpass filter device including a first transmit filter having a first transmit passband and a first receive filter having a first receive passband, the second bandpass filter device including a second transmit filter having a second transmit passband different from the first transmit passband and a second receive filter having a second receive passband different from the first receive passband;
a first dedicated antenna feed path providing a direct connection between the first bandpass filter device and the multi-feed antenna, with no switches disposed in the first dedicated antenna feed path between the first bandpass filter device and the multi-feed antenna; and
a second dedicated antenna feed path providing a direct connection between the second bandpass filter device and the multi-feed antenna, with no switches disposed in the second dedicated antenna feed path between the second bandpass filter device and the multi-feed antenna, no portion of the first dedicated antenna feed path being shared with the second dedicated antenna feed path.

2. The front-end module of claim 1 wherein the first bandpass filter device includes a first duplexer including the first transmit filter and the first receive filter, and wherein the second bandpass filter device includes a second duplexer including the second transmit filter and the second receive filter.

3. The front-end module of claim 1 further comprising:
a transmit band-select switch coupled to the first and second transmit filters;
a power amplifier connected to the transmit band-select switch, the transmit band-select switch being configured to selectively connect one of the first and second transmit filters to the power amplifier;
a receive band-select switch coupled to the first and second receive filters; and
a low-noise amplifier connected to the receive band-select switch, the receive band-select switch being configured to selectively connect one of the first and second receive filters to the low noise amplifier.

4. The front-end module of claim 1 wherein there is no overlap in frequency among the first transmit band and the second transmit band, and wherein there is no overlap in frequency among the first receive band and the second receive band.

5. The front-end module of claim 1 further comprising:
a time division duplex filter;
a third dedicated antenna feed path directly connected to the multi-feed antenna system and to the time division duplex filter;
a fourth dedicated antenna feed path directly connected to the time division duplex filter and to the multi-feed antenna;
a power amplifier; and
a band-select switch configured to selectively connect the power amplifier to one of the third and fourth dedicated antenna feed paths.

6. The front-end module of claim 5 wherein the first dedicated antenna feed path is assigned to a first transmit frequency band, the second dedicated antenna feed path is assigned to a second transmit frequency band, the third dedicated antenna feed path is assigned to a third transmit frequency band, and the fourth dedicated antenna feed path is assigned to a fourth transmit frequency band, the third and fourth transmit frequency bands being higher in frequency than the first and second transmit frequency bands and there being no overlap in frequency between the first and second transmit frequency bands, wherein the first bandpass filter device includes a first transmit filter having a first transmit passband corresponding to the first transmit frequency bands, and the second bandpass filter device includes a second transmit filter having a second transmit passband corresponding to the second transmit frequency band.

7. The front-end module of claim 6 wherein the power amplifier is a high-band power amplifier, the band-select switch is a high-band band-select switch, and further comprising:
a low-band power amplifier; and
a low-band transmit band-select switch coupled to the low-band power amplifier and to the first and second band-pass filter devices, the low-band transmit band-select switch being configured to selectively connect the low-band power amplifier to one of the first and second transmit filters.

8. The front-end module of claim 7 further comprising:
a high-band low noise amplifier coupled to the high-band band-select switch.

9. The front-end module of claim 8 wherein the first bandpass filter device further includes a first receive filter having a first receive passband, and the second bandpass filter device further includes a second receive filter having a second receive passband different from the first receive passband.

10. The front-end module of claim 9 further comprising:
a low-band low noise amplifier; and
a low-band receive band-select switch configured to selectively connect the low-band low noise amplifier to one of the first and second receive filters.

11. The front-end module of claim 1 wherein the multi-feed antenna includes a first test connector coupled to the first dedicated antenna feed path for measuring an impedance of the first dedicated antenna feed path, and a second test connector coupled to the second dedicated antenna feed path for measuring an impedance of the second dedicated antenna feed path.

12. A front-end module comprising:
a multi-feed antenna;
a plurality of dedicated antenna feed paths, each directly connected to the multi-feed antenna and assigned to a respective frequency band, no switches being disposed within any of the plurality of dedicated antenna feed paths; and
a filtering module including a corresponding plurality of bandpass filter devices, each bandpass filter device connected in a respective one of the plurality of dedicated antenna feed paths and having a passband corresponding to the respective frequency band of the dedicated antenna feed path in which the bandpass filer device is connected, there being no overlap in frequency among the respective frequency bands, the plurality of bandpass filter devices including a first bandpass filter device including a first transmit filter having a first transmit passband and a first receive filter having a first receive passband, and a second bandpass filter device including a second transmit filter having a second transmit passband different from the first transmit passband and a second receive filter having a second receive passband different from the first receive passband.

13. The front-end module of claim 12 wherein each bandpass filter device includes a transmit filter having a transmit passband and a receive filter having a receive passband.

14. The front-end module of claim 13 further comprising:
a power amplifier module including a corresponding plurality of power amplifiers, each power amplifier connected to the transmit filter of a respective one of the plurality of bandpass filter devices; and
a low noise amplifier module including a corresponding plurality of low noise amplifiers, each low noise amplifier connected to the receive filter of the respective one of the plurality of bandpass filter devices.

15. The front-end module of claim 13 further comprising:
a transmit band-select switch coupled to the transmit filter of each of plurality of bandpass filter devices; and
a power amplifier connected to the transmit band-select switch, the transmit band-select switching being configured to selectively connect the transmit filter of a selected one of the plurality of bandpass filter devices to the power amplifier.

16. The front-end module of claim 15 further comprising:
a receive band-select switch coupled to the receive filter of each of plurality of bandpass filter devices; and
a low noise amplifier connected to the receive band-select switch, the receive band-select switching being configured to selectively connect the receive filter of a selected one of the plurality of bandpass filter devices to the low noise amplifier.

17. The front-end module of claim 12 wherein the multi-feed antenna includes a corresponding plurality of test connectors, each test connector coupled to a respective one of the plurality of dedicated antenna feed paths and configured for measuring an impedance of the corresponding dedicated antenna feed path.

18. A front-end module comprising:
a multi-feed antenna;
a plurality of low-band dedicated antenna feed paths, each directly connected to the multi-feed antenna and assigned to a respective low-band frequency band, no switches being disposed within any of the plurality of low-band dedicated antenna feed paths;
a low-band filtering module including a corresponding plurality of bandpass filter devices, each bandpass filter device connected in a respective one of the plurality of low-band dedicated antenna feed paths and having a passband corresponding to the respective low-band frequency band of the low-band dedicated antenna feed path in which the bandpass filer device is connected, there being no overlap in frequency among the respective low-band frequency bands, the plurality of bandpass filter devices including a first bandpass filter device including a first transmit filter having a first transmit passband and a first receive filter having a first receive passband, and a second bandpass filter device including a second transmit filter having a second transmit passband different from the first transmit passband and a second receive filter having a second receive passband different from the first receive passband;
a low-band band-select switch coupled to the low-band filtering module;
a low-band power amplifier connected to the low-band band-select switch, the low-band band-select switch being configured to selectively connect the low-band power amplifier to a selected one of the bandpass filter devices;
a plurality of high-band dedicated antenna feed paths, each directly connected to the multi-feed antenna and assigned to a respective high-band frequency band, each of the high-band frequency bands being higher in frequency than all of the low-band frequency bands;
a high-band band select switch coupled to the plurality of high-band dedicated antenna feed paths;
a time division duplex filter coupled between the high-band band-select switch and the multi-feed antenna in each of the plurality of high-band dedicated antenna feed paths; and
a high-band power amplifier connected to the high-band band-select switch, the high-band band-select switch being configured to selectively connect the high-band power amplifier to a selected one of the plurality of high-band dedicated antenna feed paths.

19. A wireless device comprising:
a multi-feed antenna;
a multi-band transceiver configured to produce a plurality of transmit signals in a corresponding plurality of different frequency bands to be transmitted by the multi-feed antenna;
a plurality of dedicated antenna feed paths, each directly connected to the multi-feed antenna and assigned to a respective frequency band in the plurality of different frequency bands, each antenna feed path configured to direct a respective one of the plurality of transmit signals to the multi-feed antenna, no switches being disposed within any of the plurality of dedicated antenna feed paths; and
a filtering module including a corresponding plurality of bandpass filter devices, each bandpass filter device connected in a respective one of the plurality of dedicated antenna feed paths between the transceiver and the multi-feed antenna and having a passband corresponding to the respective frequency band of the dedicated antenna feed path in which the bandpass filer device is connected, the plurality of bandpass filter devices including a first bandpass filter device including a first transmit filter having a first transmit passband and a first receive filter having a first receive passband, and a second bandpass filter device including a second transmit filter having a second transmit passband different from the first transmit passband and a second receive filter having a second receive passband different from the first receive passband.

20. The wireless device of claim 19 wherein each bandpass filter device includes a transmit filter having a transmit passband configured to pass the corresponding transmit signal and a receive filter having a receive passband.

21. The wireless device of claim 20 further comprising:
a power amplifier module including a corresponding plurality of power amplifiers, each power amplifier connected between the transceiver and the transmit filter of a respective one of the plurality of bandpass filter devices; and
a low noise amplifier module including a corresponding plurality of low noise amplifiers, each low noise amplifier connected between the transceiver and the receive filter of the respective one of the plurality of bandpass filter devices.

22. The wireless device of claim 21 further comprising:
an electromagnetic coupler coupled to the power amplifier module and configured to electromagnetically couple portions of the transmit signals from transmit signal paths extending between the power amplifier module and the filtering module to provide coupled signals; and
a sensor module configured to receive the coupled signals from the electromagnetic coupler and to provide control signals to at least one of the transceiver and the power amplifier module based on the coupled signals.

23. The wireless device of claim 19 further comprising:
a power amplifier module including at least one power amplifier;
a low noise amplifier module including at least one low noise amplifier;
a transmit band-select switch configured to selectively connect the power amplifier module to the transmit filter of a selected one of the plurality bandpass filter devices; and
a receive band-select switch configured to selectively connect the low noise amplifier module to the receive filter of the selected one of the plurality of bandpass filter devices.

24. The wireless device of claim 23 further comprising:
an electromagnetic coupler coupled to the power amplifier module and configured to electromagnetically couple portions of the transmit signals from transmit signal paths extending between the power amplifier module and the filtering module to provide coupled signals; and
a sensor module configured to receive the coupled signals from the electromagnetic coupler and to provide control signals to at least one of the transceiver and the power amplifier module based on the coupled signals.

* * * * *

UNITED STATES PATENT AND TRADEMARK OFFICE
CERTIFICATE OF CORRECTION

PATENT NO. : 12,081,258 B2
APPLICATION NO. : 16/911726
DATED : September 3, 2024
INVENTOR(S) : David Richard Pehlke Page 1 of 1

It is certified that error appears in the above-identified patent and that said Letters Patent is hereby corrected as shown below:

In the Claims

Column 13, Line 23, Claim number 5, delete "system".

Signed and Sealed this
First Day of October, 2024

*Katherine Kelly Vidal*

Katherine Kelly Vidal
*Director of the United States Patent and Trademark Office*